(12) United States Patent
Hagiwara et al.

(10) Patent No.: US 7,835,257 B2
(45) Date of Patent: Nov. 16, 2010

(54) OPTICAL INFORMATION RECORDING MEDIUM

(75) Inventors: Motomitsu Hagiwara, Gunma (JP); Takeshi Otsu, Gunma (JP); Akimasa Miyata, Gunma (JP); Yuji Tomizawa, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 219 days.

(21) Appl. No.: 12/237,324

(22) Filed: Sep. 24, 2008

(65) Prior Publication Data

US 2009/0116369 A1 May 7, 2009

(30) Foreign Application Priority Data

Sep. 25, 2007 (JP) ............... 2007-247557

(51) Int. Cl.
*G11B 7/24* (2006.01)

(52) U.S. Cl. .................. 369/275.3; 369/288; 369/283; 720/718

(58) Field of Classification Search ............. 369/275.3, 369/283, 286, 288, 277, 280; 428/64.4; 720/718; 427/162

See application file for complete search history.

(56) References Cited

U.S. PATENT DOCUMENTS 5,082,690 A 1/1992 Miyake et al.
7,062,776 B2 * 6/2006 Takazawa .................. 720/718
7,154,844 B2 * 12/2006 Usami ........................ 369/286
2008/0123512 A1 5/2008 Katayama

FOREIGN PATENT DOCUMENTS

EP 0398662 A 5/1990
JP 2006-147135 A 6/2006

* cited by examiner

*Primary Examiner*—Ali Neyzari
(74) *Attorney, Agent, or Firm*—Law Office of Katsuhiro Arai

(57) ABSTRACT

An optical information recording medium includes a disk-like substrate having a hole in a central portion thereof, and a light-reflective layer, a dye recording layer containing an organic dye, an intermediate layer composed of an inorganic substance, and a light-transmissive layer composed of a resin disposed in that order on one principal surface of the substrate, in which information is recorded/reproduced by irradiation of laser light from the light-transmissive layer side. In the optical information recording medium, the light-transmissive layer covers a surface of the intermediate layer from an inner peripheral edge of the intermediate layer to an outer peripheral edge of the intermediate layer, and a vicinity of an outer peripheral edge of the light-transmissive layer is in contact with the substrate in an annular region extending around an outer peripheral side of the substrate.

19 Claims, 2 Drawing Sheets

FIG. 3 – PRIOR ART
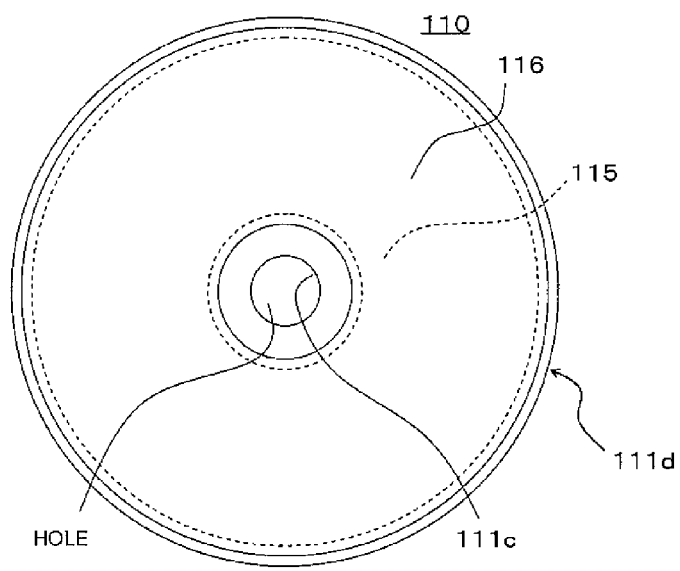
FIG. 4 – PRIOR ART
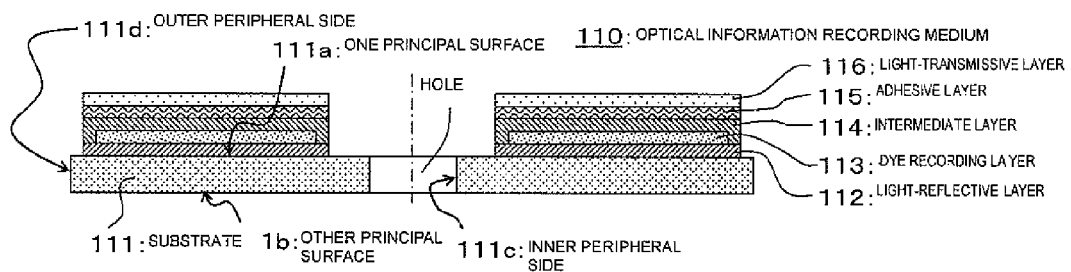

OPTICAL INFORMATION RECORDING MEDIUM

BACKGROUND OF THE INVENTION

1. Field of the Invention

The present invention relates to an optical information recording medium, and in particular relates to an optical information recording medium, such as a Blu-ray disc, which includes an optical recording layer containing an organic dye and which has an increased recording density.

2. Description of the Related Art

As information recording media, optical information recording media, such as optical disks, are widely used. Examples of such optical information recording media include a medium, such as CD-R, in which a recording layer and a reflection layer are disposed in that order on a light-transmissive resin substrate with a thickness of 1.2 mm and a diameter of 120 mm or 80 mm. In recent years, a higher information recording density has been required. Under these circumstances, a method has been conceived in which the laser wavelength is decreased and an object lens having a high numerical aperture (NA) is used, and thus, optical information recording media, such as DVD+R and DVD−R, have been realized. DVD+R or DVD−R has a structure in which, in order to increase the permissible value of the angle of tilt of the disk due to a decrease in wavelength and an increase in NA, two light-transmissive resin substrates with a thickness of 0.6 mm are bonded to each other with a reflection layer and a recording layer provided therebetween.

Furthermore, in recent years, in order to record high-definition image data, a much higher information recording density has been required. Under these circumstances, an optical information recording medium has been proposed which, as in a Blu-ray disc (BD-R), has a structure in which a reflection layer and a recording layer are disposed on a surface of a resin substrate with a thickness of 1.1 mm, and a light-transmissive layer with a thickness of 0.1 mm is disposed so as to cover the surface provided with the reflection layer and the recording layer. Specifically, the optical information recording medium includes a light-reflective layer, a phase-change recording layer, and a light-transmissive layer with a thickness of about 0.1 mm disposed on a disk-shaped substrate having an outer diameter of 120 mm, an inner diameter of 15 mm, and a thickness of about 1.1 mm, and by performing irradiation of laser light with a wavelength of about 405 nm from an optical head with a numerical aperture of about 0.85, user information can be recorded in the recording layer.

Use of a recording layer containing a dye, instead of the phase-change recording layer, is also under study. Japanese Unexamined Patent Application Publication No. 2006-147135 discloses an optical information recording medium 110 which includes at least a dye recording layer 113 containing an organic dye and a light-transmissive layer 116 composed of a resin disposed on a substrate 111 (refer to FIGS. 3 and 4). In the optical information recording medium 110, an intermediate layer 114 is provided between the dye recording layer 113 and the light-transmissive layer 116 (or an adhesive layer 115), the intermediate layer 114 preventing mixing of the dye recording layer 113 and the light-transmissive layer 116 (or adhesive layer 115). The intermediate layer 114 is composed of a Ta-containing compound, a Nb-containing compound, or a compound oxide containing Ta and/or Nb. The intermediate layer 114 has a thickness of 1 to 80 nm.

The optical information recording medium 110 described above as the related art includes an intermediate layer 114 composed of an inorganic substance, such as a Ta-containing compound or a Nb-containing compound, disposed between the dye recording layer 113 and the light-transmissive layer 116. Since adhesion between the intermediate layer 114 and the light-transmissive layer 116 (or adhesive layer 115) is not good, delamination easily occurs at the interface between the intermediate layer 114 and the light-transmissive layer 116 (or adhesive layer 115). In particular, when a user drops by mistake the optical information recording medium 110 to the floor or the like, delamination easily occurs from an outer peripheral side 111d of the optical information recording medium 110 at the interface between the intermediate layer 114 and the light-transmissive layer 116 (or adhesive layer 115). The occurrence of delamination at the interface between the intermediate layer 114 and the light-transmissive layer 116 (or adhesive layer 115) results in degradation in quality in terms of appearance as well as degradation in environmental resistance (moisture resistance), etc., which is a problem.

SUMMARY OF THE INVENTION

It is an object of the present invention to provide an optical information recording medium in which delamination does not occur at the interface between an intermediate layer and a light-transmissive layer, unlike in the related art.

In order to achieve the object described above, according to an aspect of the present invention, an optical information recording medium includes a disk-like substrate having a hole in a central portion thereof, and a light-reflective layer, a dye recording layer containing an organic dye, an intermediate layer composed of an inorganic substance, and a light-transmissive layer composed of a resin disposed in that order on one principal surface of the substrate, in which information is recorded/reproduced by irradiation of laser light from the light-transmissive layer side. In the optical information recording medium, the light-transmissive layer covers a surface of the intermediate layer from an inner peripheral edge of the intermediate layer to an outer peripheral edge of the intermediate layer, and a vicinity of an outer peripheral edge of the light-transmissive layer is in contact with the substrate in an annular region extending around an outer peripheral side of the substrate. According to the aspect of the present invention, adhesion between the substrate and the light-transmissive layer improves, and consequently, delamination can be prevented from occurring at the interface between the intermediate layer and the light-transmissive layer.

According to an embodiment of the present invention, the optical information recording medium may further include a hard coat layer disposed on the light-transmissive layer.

The above object and other objects, features, and operational advantages of the present invention will become apparent from the following description of preferred embodiments with reference to the attached drawings.

BRIEF DESCRIPTION OF THE DRAWINGS

FIG. 3 is a plan view showing an optical information recording medium according to a related art; and FIG. 4 is a cross-sectional view showing the optical information recording medium according to the related art.

DESCRIPTION OF THE PREFERRED EMBODIMENTS

Figure 1:
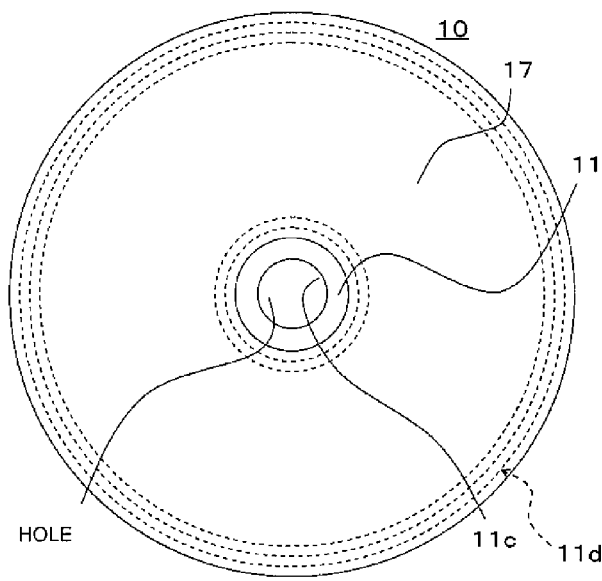
FIG. 1 is a plan view showing an overall structure of an optical information recording medium according to a first embodiment of the present invention.
Figure 2:
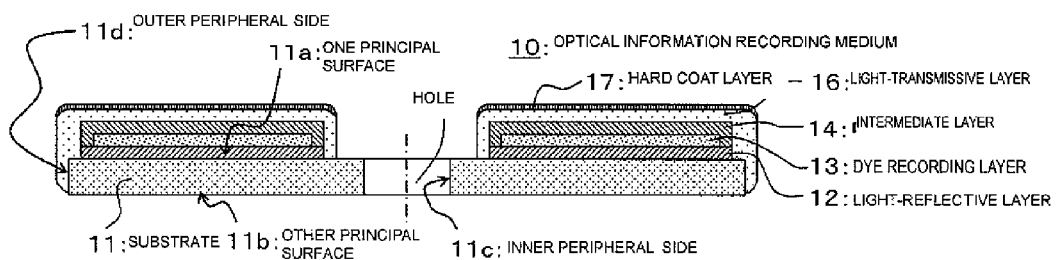
FIG. 2 is a longitudinal cross-sectional view showing an internal structure of the optical information recording medium according to the first embodiment.

An optical information recording medium according to a first embodiment of the present invention will be described below with reference to FIGS. 1 and 2. FIG. 1 is a plan view showing an overall structure of an optical information recording medium 10 according to the first embodiment. FIG. 2 is a longitudinal cross-sectional view showing an internal structure of the optical information recording medium 10 according to the first embodiment.

As shown in FIGS. 1 and 2, the optical information recording medium 10 according to this embodiment has a hole in a central portion thereof and has a disk-like outer shape with an outer diameter of about 120 mm, an inner diameter of about 15 mm, and a thickness of about 1.2 mm.

As is obvious from the drawings, a substrate 11 has a disk-like outer shape having a hole in a central portion thereof. The substrate 11 has a thickness of about 1.1 mm and is composed of a resin. Furthermore, one principal surface 11a of the substrate 11 is provided with a spiral groove (not shown).

A light-reflective layer 12 composed of an Ag alloy that reflects laser light, which will be described below, is disposed on the principal surface 11a of the substrate 11. A groove (not shown) is spirally formed in a surface of the light-reflective layer 12, opposite to the surface in contact with the principal surface 11a provided with the groove, at the same track pitch as that of the groove of the substrate 11 so as to correspond to the groove of the substrate 11. The light-reflective layer 12 has a land (not shown) between adjacent segments of the spiral groove.

A dye recording layer 13 containing a light-absorbing material composed of an organic dye represented by general formula 1 below is disposed on the light-reflective layer 12, the light-absorbing material absorbing laser light with a wavelength of 400 to 420 nm (e.g., 405 nm).

General Formula 1

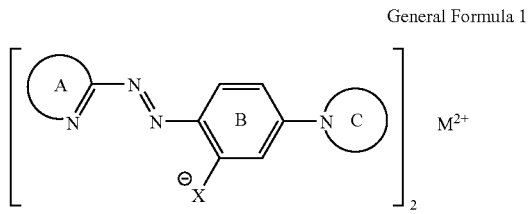

In general formula 1, ring A represents a heterocyclic ring formed together with the carbon atom and the nitrogen atom bonded thereto; ring B represents an optionally substituted benzene ring; ring C represents a heterocyclic ring containing the nitrogen atom bonded thereto and may form a bond together with the ring B; $X^-$ represents a group which can have active hydrogen; and $M^{2+}$ represents a divalent metal cation, the dye being a metal complex in which one molecule of $M^{2+}$ is bonded to two azo dye molecules represented by anions.

An intermediate layer 14 made of an inorganic substance composed of a $Nb_2O_5$—$Al_2O_3$-based compound oxide containing 60 mole percent of $Nb_2O_5$ is formed on the dye recording layer 13 using a target composed of a $Nb_2O_5$—$Al_2O_3$-based compound oxide containing 60 mole percent of $Nb_2O_5$.

A light-transmissive layer 16 composed of a transparent resin material is disposed on the intermediate layer 14. The light-transmissive layer 16 has a thickness of about 0.1 mm.

The optical information recording medium 10 according to this embodiment further includes a hard coat layer 17 composed of an ultraviolet curable resin provided on the light-transmissive layer 16 in order to prevent the surface of the light-transmissive layer 16 from being damaged.

In the optical information recording medium 10 according to this embodiment, the light-transmissive layer 16 covers the surface of the intermediate layer 14 from the inner peripheral edge to the outer peripheral edge of the intermediate layer 14, and a vicinity of an outer peripheral edge of the light-transmissive layer 16 is in contact with the substrate 11 in an annular region extending around an outer peripheral side 11d of the substrate 11. Consequently, adhesion between the substrate 11 and the light-transmissive layer 16 improves, and thereby, delamination can be prevented from occurring at the interface between the intermediate layer 14 and the light-transmissive layer 16.

When laser light with a wavelength of 400 to 420 nm (e.g., 405 nm) is applied to the optical information recording medium 10 from the light-transmissive layer 16 side, the organic dye in the dye recording layer 13 absorbs the laser light and generates heat to form pits (not shown) which can be optically read, and thus user information can be satisfactorily recorded.

A preferred embodiment of the substrate 11 will be described below. As the substrate 11, any of various materials for the substrates of the known optical information recording media can be selected for use. Specific examples thereof include polycarbonate; acrylic resins, such as and polymethyl methacrylate; vinyl chloride-based resins, such as polyvinyl chloride and vinyl chloride copolymers; epoxy resins: amorphous polyolefins; polyester resins; metals, such as aluminum; and glass. As required, these may be used in combination. Among the materials described above, in view of moldability, moisture resistance, dimensional stability, low cost, etc., a thermoplastic resin is preferable, and polycarbonate is particularly preferable.

When any of these resins is used, preferably, the substrate 11 is formed by injection molding or the like into a predetermined shape (annular shape in the case of an optical disk). The thickness of the substrate 11 is preferably in a range of 0.9 to 1.1 mm. In this step, preferably, a die plate, which is referred to as a stamper and on which a spiral protrusion having a reverse pattern of the groove on one surface of the substrate 11 is formed by micromachining, is placed in a mold used for injection molding of the substrate 11 so that the spiral groove is formed simultaneously during the injection molding of the substrate 11. The groove is generally formed with a pitch of 0.35 or 0.32 μm. Furthermore, the substrate 11 is not limited to that described above. For example, a method may be used in which an ultraviolet curable resin is applied by coating onto a base, and the coating film is cured, separated from the base, and used as the substrate 11.

A preferred embodiment of the light-reflective layer 12 will be described below. The light-reflective layer 12 reflects laser light for recording and/or reproducing data, and in the present invention, in order to increase the reflectance with respect to laser light and provide a function of improving recording and reproducing characteristics, preferably, the light-reflective layer 12 is disposed between the substrate 11 and the dye recording layer 13. The light-reflective layer 12 is preferably composed of a metal thin film having a high reflectance. Examples thereof include metal films, such as Au, Al, Ag, Cu, and Pd; alloy films of these metals, such as Ag alloy films, Al alloy films, and alloy films in which trace components are added to these metals. Preferably, the light-reflective layer 12 is formed, for example, by vapor deposition, ion plating, sputtering, or the like, on the one principal surface 11a provided with the groove. In view of mass productivity and cost, sputtering is particularly preferable. A spiral groove is preferably formed in a surface of the light-reflective layer 12, opposite to the surface in contact with the principal surface 11a of the substrate 11, at the same track pitch as that of the groove of the substrate 11 so as to correspond to the groove of the substrate 11. Preferably, the groove is formed by forming the light-reflective layer 12 by sputtering or the like at a uniform thickness on the one principal surface 11a of the substrate 11 provided with the spiral groove.

A preferred embodiment of the dye recording layer 13 will be described below. The dye recording layer 13 preferably contains a light-absorbing material composed of an organic dye which absorbs laser light. In particular, the dye recording layer 13 is a dye-type optical recording layer in which pits are formed by irradiation of laser light, and thus data is recorded. As the organic dye, a phthalocyanine dye, a cyanine dye, an azo-based dye, or the like is preferable, and the azo-based dye represented by general formula 1 is more preferable. General formula 1 is again described below.

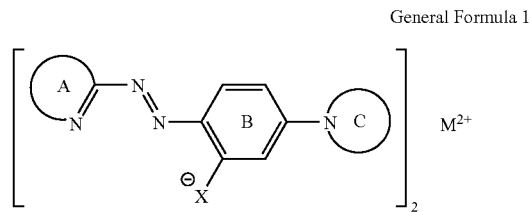

General Formula 1

In general formula 1, ring A represents a heterocyclic ring formed together with the carbon atom and the nitrogen atom bonded thereto; ring B represents an optionally substituted benzene ring; ring C represents a heterocyclic ring containing the nitrogen atom bonded thereto and may form a bond together with the ring B; $X^-$ represents a group which can have active hydrogen; and $M^{2+}$ represents a divalent metal cation, the dye being a metal complex in which one molecule of $M^{2+}$ is bonded to two azo dye molecules represented by anions.

The dye recording layer 13 is preferably formed by a method in which a coating solution is prepared by dissolving the dye represented by general formula 1, a binder, etc., in a solvent, such as tetrafluoropropanol (TFP). The coating solution is applied by spin-coating, screen-printing, or the like on the substrate 11 over the light-reflective layer 12 to form a coating film, and then the coating film is dried, for example, at 80° C. for 30 minutes.

A preferred embodiment of the intermediate layer 14 will be described below. The intermediate layer 14 is preferably formed between the dye recording layer 13 and the light-transmissive layer 16, which will be described below, in order to prevent mixing of the dye recording layer 13 and the light-transmissive layer 16. The intermediate layer 14 is preferably composed of a $Nb_2O_5$—$Al_2O_3$-based compound oxide. However, the present invention is not limited thereto, and various changes are possible. The intermediate layer 14 is preferably light-transmissive, and is preferably formed, for example, by vapor deposition, ion plating, sputtering, or the like, on the surface provided with the dye recording layer 13. In view of mass productivity and cost, sputtering using an RF sputtering system is particularly preferable. In the RF sputtering system, an AC (radio frequency) voltage is applied between a conductive vacuum chamber and a target. Electrons on the target side have nowhere to go, thus increasing the density. As a result, the target side is negatively biased, ions are attracted to the target, the ions collided with the target sputter the particles of the target. The sputtered particles of the compound oxide collide with and adhere to the dye recording layer 13 of the substrate 11, and thus the intermediate layer (inorganic substance layer) 14 is formed. When the intermediate layer 14 is formed by sputtering using the RF sputtering system, the pressure in the vacuum chamber is preferably set at $1 \times 10^{-2}$ to $1 \times 10^{-5}$ torr, and the sputtering rate is preferably set at 0.1 to 10 nm/sec. Furthermore, the sputtering power is preferably 0.2 to 2.5 kW.

A preferred embodiment of the light-transmissive layer 16 will be described below. The light-transmissive layer 16 is preferably composed of a light-transmissive resin, and is preferably formed, by spin-coating or the like, using an ultra-violet resin. The thickness of the light-transmissive layer 16 is preferably approximately 0.1 mm so that data can be recorded in and/or read from the dye recording layer 13 by irradiation of laser light with a wavelength of, usually, about 400 to 420 nm (e.g., 405 nm). The light transmittance of the light-transmissive layer 16 is preferably approximately 70% or more, and more preferably approximately 80% or more, when measured by a spectrophotometer using light with a wavelength of about 400 to 420 nm (e.g., 405 nm) at a thickness after curing of 0.1 mm.

Furthermore, preferably, the light-transmissive layer 16 covers the surface of the intermediate layer 14 from the inner peripheral edge to the outer peripheral edge of the intermediate layer 14, and a vicinity of an outer peripheral edge of the light-transmissive layer 16 is in contact with the substrate 11 in an annular region extending around an outer peripheral side 11d of the substrate 11.

The light-transmissive layer 16 is formed on the outer peripheral side 11d of the substrate 11, preferably, by a method in which, before or after the application of the light-transmissive resin by spin-coating or the like described above, the light-transmissive resin is separately applied to the outer peripheral side 11d of the substrate 11. Of course, application of the light-transmissive layer 16 on the outer peripheral side 11d of the substrate 11 is not limited to being separate from application of the light-transmissive layer 16 on the intermediate layer 14. Additionally, in some embodiments, application of at least a portion of the light-transmissive layer 16 on the outer peripheral side 1d is performed substantially contemporaneous with application of the light-transmissive layer 16 on the intermediate layer 14.

The resin is applied to the outer peripheral side 11d of the substrate 11, preferably, by a method in which, for example, a coating means (not shown), such as a transfer roller or a spray nozzle, is arranged so as to face, in contact with or away from, the outer peripheral side 11d of the substrate 11, and using the coating means, the light-transmissive resin is applied to the annular region extending around the outer peripheral side 11d of the substrate 11. By this method, the resin can be applied with a uniform thickness to the outer peripheral side 11d of the substrate 11. The present invention is not limited thereto. For example, the uncured resin irregularly protruding over the outer peripheral side 11d of the substrate 11 in the application process by spin-coating may be spread over the outer peripheral side 11d of the substrate 11 using a roller, a squeegee, or the like arranged in the same manner as above.

The thickness of the transparent resin formed by coating on the outer peripheral side 11d of the substrate 11 is preferably approximately 100 μm to approximately 300 μm, and is preferably approximately equal to or larger than the thickness of the resin applied onto the intermediate layer 14. Furthermore, the light-transmissive layer 16 covers the entire surface of the outer peripheral side 11d of the substrate II so that the edge of the outer periphery of the light-transmissive layer 16 reaches the lower end of the outer peripheral side 11d of the substrate 11. However, the present invention is not limited thereto as long as the edge of the outer periphery of the light-transmissive layer 16 is in contact with the substrate 11 in the annular region extending around the outer peripheral side 11d of the substrate 11.

Examples of an optical information recording medium 10 according to an embodiment of the present invention will be described below.

EXAMPLE

A resist film was formed by applying a photoresist (photosensitizing agent) onto a glass board at a predetermined thickness, exposure was performed using laser light of a cutting apparatus so as to achieve a predetermined exposure width, and then a developer was added dropwise onto the resulting glass board to carry out development treatment. Thereby, an irregular resist pattern corresponding to the groove of a substrate of a disk-shaped optical information recording medium was formed. Then, nickel was precipitated by plating treatment on the glass board, and the resulting nickel film was separated from the glass board and trimmed so as to have a disk-like outer shape. Thereby, a stamper was obtained. The stamper was set in a cavity of an injection molding apparatus, and a polycarbonate resin was injected into the cavity. Thereby, a substrate 11 having a spiral groove on one principal surface 11a thereof was obtained.

An Ag alloy was sputtered to the principal surface 11a of the substrate 11 provided with the spiral groove, at a uniform thickness, using a sputtering system. Thereby, a light-reflective layer 12 with a thickness of 100 nm having a spiral groove corresponding to the groove of the substrate 11 on a surface opposite to the surface in contact with the principal surface 11a of the substrate 11 was formed.

Furthermore, a dye solution containing an azo-based organic dye represented by general formula 1 was applied by spin-coating onto the light-reflective layer 12 on the substrate 11 at a thickness of 60 nm, followed by drying, to obtain a dye recording layer 13.

Then, an intermediate layer 14 made of an inorganic substance composed of a $Nb_2O_5$—$Al_2O_3$-based compound oxide containing about 60 mole percent of $Nb_2O_5$ with a thickness of 25 nm was formed on the dye recording layer 13 by sputtering under the condition of a sputtering power of 2.0 kW in a sputtering system, using a target composed of a $Nb_2O_5$—$Al_2O_3$-based compound oxide containing 60 mole percent of $Nb_2O_5$. The compositions of the target and the intermediate layer 14 were confirmed by an ICP analyzer.

Next, an ultraviolet curable resin was applied by spin-coating onto the intermediate layer 14 so as to cover the surface of the intermediate layer 14 from the inner peripheral edge to the outer peripheral edge of the intermediate layer 14, and cured by UV irradiation. Then, a transfer roller was arranged so as to face the outer peripheral side 11d of the substrate 11, and the same ultraviolet curable resin was applied by a roller transfer method so as to be in contact with the substrate 11 in an annular region extending around the outer peripheral side 11d of the substrate 11, and cured by UV irradiation. Thereby, a light-transmissive layer 16 having a thickness of 0.1 mm on the intermediate layer 14 and a thickness of 200 μm on the outer peripheral side 11d of the substrate 11 was formed. Furthermore, an ultraviolet curable resin composed of an acrylic resin was applied by spin-coating onto the light-transmissive layer 16 to form a hard coat layer 17 with a thickness of 2 to 3 μm. Thereby, a sample of an optical information recording medium was prepared.

The appearance of the sample of the optical information recording medium 10 was visually observed from the light-transmissive layer 16 side. As a result, no delamination from the outer peripheral side 11d was found at the interface between the intermediate layer 14 and the light-transmissive layer 16. Next, the sample of the optical information recording medium 10 was dropped from a height of 80 cm onto a corner portion of a resin block. With respect to the sample, the occurrence of delamination from the outer peripheral side 11d at the interface between the intermediate layer 14 and the light-transmissive layer 16 was again examined. As a result, no delamination from the outer peripheral side 11d was observed.

Comparative Example

In the Comparative Example, a sample of an optical information recording medium was prepared as in the Example except that a transparent resin sheet with a thickness of 0.1 mm was bonded onto the intermediate layer using an ultraviolet curable adhesive layer to form a light-transmissive layer. Then, as in the Example, the occurrence of delamination at the interface between the intermediate layer and the light-transmissive layer and the occurrence of delamination from the outer peripheral side after the same drop test as that described above were observed. As a result, in the sample after the drop test, delamination from the outer peripheral side was observed.

Modification of the Example

In the optical information recording medium 10 according to the first embodiment, the light-reflective layer 12 and the dye recording layer 13 are disposed in that order on one principal surface 11a of the substrate 11, and the intermediate layer 14 is disposed on the dye recording layer 13. However, the present invention is not limited thereto. An intermediate layer 14 may be formed directly or through another layer on one principal surface 11a of the substrate 11. Furthermore, in the optical information recording medium 10 according to the first embodiment, the hard coat layer 17 is further disposed on the light-transmissive layer 16. However, the present invention is not limited thereto. The hard coat layer 17 may be omitted.

The structure and the operation of the present invention are not limited to the above descriptions. Various modifications may be made without departing from the spirit and scope of the present invention. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:
1. An optical information recording medium comprising:
a disk-like substrate having a hole in a central portion thereof; and a light-reflective layer, a dye recording layer comprising an organic dye, an intermediate layer comprising an inorganic substance, and a light-transmissive layer comprising a resin, disposed in that order on one principal surface of the substrate, in which information is recorded and/or reproduced by irradiation of laser light from the light-transmissive layer side, wherein the light-transmissive layer covers a surface of the intermediate layer from an inner peripheral edge of the intermediate layer to an outer peripheral edge of the intermediate layer, and a vicinity of an outer peripheral edge of the light-transmissive layer is in contact with the substrate over at least part of an annular region extending around an outer peripheral side of the substrate.

2. The optical information recording medium according to claim 1, further comprising a hard coat layer disposed on the light-transmissive layer.

3. The optical information recording medium according to claim 1, wherein a thickness of the light-transmissive layer in an area covering the surface of the intermediate layer is approximately 0.1 mm.

4. The optical information recording medium according to claim 1, wherein a thickness of the light-transmissive layer in an area on the outer peripheral side of the substrate is approximately 100 μm to approximately 300 μm.

5. The optical information recording medium according to claim 4, wherein the thickness is approximately 200 μm.

6. The optical information recording medium according to claim 1, wherein a first thickness of the light-transmissive layer in a first area on the outer peripheral side of the substrate is approximately equal to or larger than a second thickness of the light-transmissive layer in a second area covering the surface of the intermediate layer.

7. The optical information recording medium according to claim 1, wherein the light-transmissive layer covers the entire surface of the outer peripheral side of the substrate.

8. The optical information recording medium according to claim 1, wherein a light transmittance of the light-transmissive layer as measured with respect to light with a wavelength of about 400 nm to 420 nm is approximately 70% or greater.

9. The optical information recording medium according to claim 1, wherein the dye recording layer comprises a phthalocyanine dye, a cyanine dye, or an azo-based dye.

10. The optical information recording medium according to claim 1, wherein the intermediate layer comprises an $Nb_2O_5$—$Al_2O_3$-based oxide.

11. A method of manufacturing an optical information recording medium, comprising:
    depositing a light-reflective layer on a disk-like substrate having a hole in a central portion thereof;
    depositing a dye recording layer comprising an organic dye on the light-reflective layer;
    depositing an intermediate layer comprising an inorganic substance on the dye recording layer; and
    depositing a light-transmissive layer comprising a resin on the intermediate layer such that the light-transmissive layer covers a surface of the intermediate layer from an inner peripheral edge of the intermediate layer to an outer peripheral edge of the intermediate layer; and
    depositing a light-transmissive layer comprising a resin in contact with the substrate over at least part of an annular region extending around an outer peripheral side of the substrate.

12. The method according to claim 11, wherein a first portion of resin is applied to the outer peripheral side separate from applying a second portion of resin on the surface of the intermediate layer.

13. The method according to claim 1, wherein resin is applied to the surface of the intermediate layer and to the outer peripheral side substantially contemporaneously.

14. The method according to claim 11, wherein the depositing a resin in contact with the substrate comprises applying at least a portion of the resin to the annular peripheral side of the substrate using a transfer roller.

15. The method according to claim 11, wherein the depositing a resin in contact with the substrate comprises applying at least a portion of the resin to the annular peripheral side of the substrate using a spray nozzle.

16. The method according to claim 11, further comprising spreading irregular portions of the light-transmissive layer over the annular peripheral side of the substrate using a roller or a squeegee.

17. The method according to claim 11, wherein the depositing the light-transmissive layer on the intermediate layer comprises spin-coating using an ultraviolet resin.

18. The method according to claim 11, further comprising depositing a hard coat layer on the light-transmissive layer.

19. The method according to claim 18, wherein the hard coat layer comprises an acrylic resin.

* * * * *

UNITED STATES PATENT AND TRADEMARK OFFICE
CERTIFICATE OF CORRECTION

| | | |
|---|---|---|
| PATENT NO. | : 7,835,257 B2 | |
| APPLICATION NO. | : 12/237324 | |
| DATED | : November 16, 2010 | |
| INVENTOR(S) | : Motomitsu Hagiwara et al. | |

It is certified that error appears in the above-identified patent and that said Letters Patent is hereby corrected as shown below:

In Claim 13 in line 22 of column 10, please delete the number "1" and insert the number --11-- therefor.

Signed and Sealed this
Twenty-fifth Day of January, 2011

David J. Kappos
*Director of the United States Patent and Trademark Office*